United States Patent
Husemann et al.

(10) Patent No.: US 6,663,958 B2
(45) Date of Patent: Dec. 16, 2003

(54) PRESSURE SENSITIVE ADHESIVE, PARTICULARLY FOR APOLAR SURFACES

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 111 days.

(21) Appl. No.: 10/077,657

(22) Filed: Feb. 15, 2002

(65) Prior Publication Data

US 2003/0013790 A1 Jan. 16, 2003

(30) Foreign Application Priority Data

Jun. 20, 2001 (DE) .......................... 101 29 611

(51) Int. Cl.$^7$ ............................. B32B 15/04
(52) U.S. Cl. ................... 428/355 AC; 428/355 R; 526/329.7; 526/328.5; 526/329
(58) Field of Search ............... 526/329.7, 329, 526/328.5, 318.5; 428/355 R, 355 AC

(56) References Cited

U.S. PATENT DOCUMENTS

| | | | | |
|---|---|---|---|---|
| 5,225,470 A | * | 7/1993 | Mancinelli | 524/271 |
| 5,229,195 A | * | 7/1993 | Maruoka et al. | 428/220 |
| 5,294,668 A | * | 3/1994 | Babu | 525/80 |
| 5,578,683 A | * | 11/1996 | Koch et al. | 525/301 |
| 5,625,005 A | * | 4/1997 | Mallya et al. | 525/301 |
| 5,648,166 A | * | 7/1997 | Dunshee | 428/355 AC |
| 5,650,215 A | * | 7/1997 | Mazurek et al. | 428/156 |
| 6,589,651 B2 | * | 7/2003 | Lau et al. | 428/355 EN |
| 2001/0044024 A1 | * | 11/2001 | Miyashita et al. | 428/355 R |
| 2003/0013790 A1 | * | 1/2003 | Husemann et al. | 524/313 |
| 2003/0096111 A1 | * | 5/2003 | Husemann et al. | 428/355 AC |

FOREIGN PATENT DOCUMENTS

| | | | | |
|---|---|---|---|---|
| EP | 0 651 013 B1 | 7/1998 | | |
| EP | 0 822 967 B1 | 6/1999 | | |
| EP | 0 921 170 A1 | * 6/1999 | .......... | C09J/153/00 |
| WO | WO 95/02003 | 1/1995 | | |

* cited by examiner

Primary Examiner—David W. Wu
Assistant Examiner—Rip A Lee
(74) Attorney, Agent, or Firm—Norris McLaughlin & Marcus

(57) ABSTRACT

A pressure sensitive adhesive based on block copolymers, said block copolymers having at least one unit composed of three successive polymer blocks, said three successive polymer blocks being chosen in alternation from the group of the polymer blocks P(A) and P(B), wherein P(A) represents a homopolymer or copolymer block obtainable from a component A which is composed of at least two monomers A1, A2, the polymer block P(A) having a softening temperature of from −80° C. to 0° C., at least one (A1) of the monomers of component A is an acrylic or methacrylic acid derivative of the general formula $$CH_2=CH(R^I)(COOR^{II}) \qquad (I)$$

in which $R^I$=H or $CH_3$ and $R^{II}$ is an aliphatic, linear, branched or cyclic, unsubstituted or substituted, saturated or unsaturated, alkyl radical having from 1 to 20 carbon atoms, at least one further (A2) of the monomers of component A is an acrylated macromonomer of the general formula $$CH_2=CH(R^{III})(COOR^{IV}) \qquad (II)$$

in which $R^{III}$=H or $CH_3$ and $R^{IV}$ is an aliphatic, linear, branched or cyclic, unsubstituted or substituted, saturated or unsaturated alkyl radical having more than 30 carbon atoms, and the average molecular weight $M_n$ of said at least one macromonomer is between 492 g/mol and 30 000 g/mol, P(B) represents a homopolymer or copolymer block obtainable from a component B which is composed of at least one monomer B1, the polymer block P(B) having a softening temperature of from 20° C. to 175° C., and the polymer blocks P(A) are not homogeneously miscible with the polymer blocks P(B).

18 Claims, No Drawings

PRESSURE SENSITIVE ADHESIVE, PARTICULARLY FOR APOLAR SURFACES

The invention relates to pressure sensitive adhesives based on block copolymers, said block copolymers comprising at least the unit P(A)-P(B)-P(A), composed of a middle polymer block P(B) and of two polymer blocks P(A) surrounding the middle polymer block P(B), or the unit P(B)-P(A)-P(B), composed of a middle polymer block P(A) and of two polymer blocks P(B) surrounding the middle polymer block P(A), to the use of such adhesives, and to a process for preparing them.

In industry, hotmelt processes operating with solventless coating technology are of growing importance in the preparation of pressure sensitive adhesives. In general, environmental regulations and increasing costs are forcing forward the development process of such adhesives. Besides SIS (styrene-isoprene-styrene copolymers) systems, acrylic polymers are increasingly being applied from the melt as a polymer film to backing materials. Moreover, for specialty applications, pressure sensitive adhesive tapes which feature very low outgassing are needed. This is something which can be ensured only by means of hotmelt processes, since conventional coatings applied from solution always still contain small fractions of residual solvent.

Additionally, there is a growing need for acrylic pressure sensitive adhesives on apolar surfaces. In industry, the use of plastics is on the increase, owing to the weight reduction they offer as compared with conventional metals, and, accordingly, more and more adhesive bonds are being formed on these substrates. Since the large number of their ester groups makes polyacrylates relatively polar, bond strength can be increased only by using resins of similar polarity. Although these resins exhibit good bond strength on polar surfaces such as steel, their bond strengths to apolar surfaces are merely moderate, which is inadequate for the majority of applications.

U.S. Pat. No. 4,418,120 A describes crosslinked pressure sensitive adhesives comprising rosin ester resins, which possess good bond strength to polypropylene. Owing to the unsaturated nature of the resin, however, the UV stability of these adhesives is poor. The bond strengths to the apolar surfaces as well are relatively low.

U.S. Pat. No. 4,726,982 A describes crosslinked pressure sensitive adhesives featuring high bond strength to inks and paints. The copolymers of acrylic esters and N-vinyl-2-pyrrolidone are blended with tackifiers such as poly (isobornyl methacrylate), pentaerythritol esters of rosins, and mixed aliphatic/aromatic resins.

Here again, relatively polar resins are used to increase the bond strength to apolar surfaces. The tackifiers mostly described, however, possess unsaturated compounds which, in the hotmelt process, can lead to instances of gelling; additionally, after bonding, the unsaturated compounds undergo aging or weathering under UV light and, accordingly, the adhesive properties suffer over a prolonged period of time.

In EP 0 707 604 A1, polyethylene/butylene macromonomers are used for copolymerization with acrylates. As a result, phases are formed which have a low glass transition temperature, which in turn allow the adhesives to flow on apolar surfaces and thus ensure high bond strengths to PE and PP. A disadvantage is the poor conversion of the polymerization process described. Furthermore, the macromonomers are copolymerized randomly, and so no domains are able to form. Such domains would offer regions in which even very apolar resins would be soluble. With these pressure sensitive adhesive tapes, therefore, only a relatively low bond strength to apolar surfaces is attained.

Furthermore, the polyacrylates described are very difficult to process as hotmelts because the high residual monomer fractions impact negatively on the concentration process, and migration within the pressure sensitive adhesive tape can have an adverse effect on the long-term adhesive properties.

In contrast, styrene-isoprene-styrene (SIS) block copolymers are widespread as elastomers for hotmelt-processable pressure sensitive adhesives [preparation processes: U.S. Pat. No. 3,468,972 A; U.S. Pat. No. 3,595,941 A; use in pressure sensitive adhesives: U.S. Pat. No. 3,239,478 A; U.S. Pat. No. 3,935,338 A] with high bond strength to apolar surfaces. Their effective processability is achieved by means of a relatively low molecular weight and by means of a specific morphology [EP 0 451 920 B1]. These pressure sensitive adhesives can be crosslinked very effectively with UV light in the presence of photoinitiators or with electron beams, since the middle blocks contain a large number of double bonds.

Nevertheless, these elastomers are not without their disadvantages, such as, for example, severe aging under UV light (i.e., in daylight too) and in an oxygen/ozone atmosphere. Another very unfavorable property for application is the relatively low thermal shear strength. These pressure sensitive adhesives, accordingly, are unsuited to relatively long-term, outdoor bonding applications and to applications within relatively high temperature ranges. Moreover, owing to the formation of domains of the hard polystyrene end blocks, effective flow on apolar surfaces is prevented. The same applies to other block copolymers which possess a middle block containing at least one double bond [U.S. Pat. No. 5,851,664 A].

A solution to the aging problems, the hotmelt processability, the high cohesion, and the efficient radiation-chemical crosslinking is offered by the combination of SIS polymers and polyacrylates.

U.S. Pat. No. 5,314,962 A describes A-B-A block copolymers as elastomers for adhesives, which possess A domain formation as their cohesion-forming feature. As a result of the selection of the comonomers used, however, only low bond strengths can be realized on apolar surfaces. Additionally, these polymers are not compatible with highly apolar resins.

EP 0 921 170 A1 describes A-B-A block copolymers which have been modified with additions of resin. Here again, owing to the selection of the comonomers and added resins, only poor bond strengths can be realized on apolar surfaces.

EP 0 408 429 A1 and EP 0 408 420 A1 described A-B-A block copolymers which, however, were synthesized by living anionic polymerization. Because of the absence of an acrylic acid fraction, however, these polymers are unsuited to use as pressure sensitive adhesives, since the internal cohesion of the middle block is too low and an at least lower fraction of polar monomers is required for bonds to steel. Because of the anionic polymerization, it is not possible to use acrylic acid comonomers or other hydroxyl-functionalized acrylate comonomers, such as hydroxyethyl acrylate, for example.

In U.S. Pat. No. 5,166,274 A, this deficiency is compensated by hydrolyzing block copolymers of tert-butyl methacrylate in order to liberate the carboxylic acid function. On the industrial scale, however, this method cannot be applied to pressure sensitive adhesives, since the hydrolysis step is very costly and time consuming.

In U.S. Pat. No. 6,069,205 A1, diblock and triblock copolymers are prepared by an atom transfer polymerization and utilized for adhesives. This method is also unsuitable for preparing pressure sensitive adhesives, since it uses relatively high catalytic amounts of heavy metal compounds which would have to be removed, in a cumbersome operation, by extraction processes.

EP 1 008 640 A1 describes styrene block copolymers comprising an acrylate middle block composed, however, of the common $C_2$ to $C_{14}$ alkylacrylates. Because of the restriction of the comonomers and, associated therewith, the restriction of the resins which can be used, only low bond strengths to apolar substrates are achievable with these polymers. Moreover, metal salts are used to prepare these polymers too (in analogy to U.S. Pat. No. 6,069,205 A), which would have to be removed, again a cumbersome operation, for pressure sensitive adhesive tape applications.

It is an object of the invention to provide improved pressure sensitive adhesives based on polyacrylate which do not have the disadvantages of the prior art, or in which said advantages are reduced, and which, therefore, exhibit good cohesion even in the uncrosslinked state and possess very high bond strengths to apolar surfaces. Further desirable qualities are minimal change on aging, and suitability particularly for processing by the hotmelt process and for use as a hotmelt adhesive.

This object is achieved by the pressure sensitive adhesives of the invention as specified in the main claim. The subclaims relate to improved embodiments of these pressure sensitive adhesives, to a process for preparing them, and to their use.

The invention accordingly provides a pressure sensitive adhesive based on block copolymers, said block copolymers having at least one unit composed of three successive polymer blocks, said three successive polymer blocks being chosen in alternation from the group of the polymer blocks P(A) and P(B), wherein P(A) represents a homopolymer or copolymer block obtainable from a component A which is composed of at least two monomers A1, A2, the polymer block P(A) having a softening temperature of from −80° C. to 0° C., at least one (A1) of the monomers of component A is an acrylic or methacrylic acid derivative of the general formula

$$CH_2=CH(R^I)(COOR^{II}) \quad (I)$$

in which $R^I$=H or $CH_3$ and $R^{II}$ is in particular a branched or unbranched, cyclic, saturated or unsaturated, substituted or unsubstituted alkyl radical having from 1 to 20, with particular preference from 4 to 14, carbon atoms, at least one further (A2) of the monomers of component A is an acrylated macromonomer of the general formula

$$CH_2=CH(R^{III})(COOR^{IV}) \quad (II)$$

in which $R^{III}$=H or $CH_3$ and $R^{IV}$ is an aliphatic, linear or branched or cyclic, unsubstituted or substituted alkyl radical having more than 30 carbon atoms, the average molecular weight $M_n$ (numerical average) of said at least one macromonomer being between 492 g/mol (30 carbon atoms) and 30 000 g/mol, P(B) represents a homopolymer or copolymer block obtainable from a component B which is composed of at least one monomer B1, the polymer block P(B) having a softening temperature of from 20° C. to 175° C., and the polymer blocks P(A) are not homogeneously miscible with the polymer blocks P(B).

Accordingly, the block copolymers of the inventive pressure sensitive adhesive comprise at least the unit P(B)-P(A)-P(B) composed of a middle polymer block P(A) and of two polymer blocks P(B) enclosing the middle polymer block P(A), and/or the structural unit which is inverse to this, i.e., at least the unit P(A)-P(B)-P(A) composed of a middle polymer block P(B) and of two polymer blocks P(A) enclosing the middle polymer block P(B), subject to the above-described provisos for the polymer blocks P(A) and P(B).

The block copolymers for the pressure sensitive adhesive of the invention can be prepared and used to advantage in a very wide variety of structures. Explicitly, reference may be made to linear or branched chains of the polymer blocks P(A) and P(B), corresponding for example to a general structure $[P(A)-P(B)]_n$, to star polymers of P(A) and P(B), corresponding for example to the general structures $[[P(A)-P(B)]_n]_m X$ or $[[P(B)-P(A)]_n]_m X$ or $[[P(A)-P(B)]_n]_m X[P(A)-P(B)]_{pq}$, or to the general structures $[[P(A)-P(B)]_n]_m XL_p$ or $[[P(B)-P(A)]_n]_m XL_p$, in which L here can denote different radicals. The enumeration of these structures is intended only by way of example, without representing any limitation. The structures also embrace all of the "asymmetric" structures in which all of the polymer blocks P(A) and P(B) meet per se the definitions set out above, but in which the indices n, m, p and q imply only the multiple occurrence of the individual units but not their chemical or structural identity. L can with preference be radicals which, for example, represent poly(meth)acrylates but which do not inherently have a block structure. Also included here are homopolymers of the components A or B.

In one advantageous further development of the invention, at least one vinyl compound containing functional groups is used additionally as monomer A3 for component A.

One particularly advantageous embodiment of the invention features the following composition of component A:
  from 35 to 97% by weight acrylic acid and/or methacrylic acid derivatives corresponding to monomer A1,
  from 3 to 40% by weight macromonomers corresponding to monomer A2,
  from 0 to 25% by weight vinyl compounds corresponding to monomer A3.

In a very advantageous procedure, the monomers chosen for component A are acrylic and/or vinyl monomers which lower the glass transition temperature of the block P(A)—alone or in combination with further monomers for component A—to below 0° C.

As monomers A1 it is preferred to use one or more compounds described by the general formula (I) in which $R^I$=H or $CH_3$ and the radical $R^{II}$ is chosen from the group consisting of aliphatic linear, branched or cyclic, substituted or unsubstituted, saturated or unsaturated alkyl radicals having from 4 to 14, preferably from 4 to 9, carbon atoms.

Preferred examples of monomers A1 are n-butyl acrylate, n-pentyl acrylate, n-hexyl acrylate, n-heptyl acrylate, n-octyl acrylate, n-nonyl acrylate and their branched isomers, such as 2-ethylhexyl acrylate, for example. Furthermore, the methacrylates corresponding to the abovementioned acrylates are among preferred examples of the monomers A1. Compounds which lend themselves outstandingly to use as monomers A1 are, additionally, isobutyl acrylate, isooctyl acrylate, and isobornyl acrylate.

For the monomer A2 it is preferred to use hydrogenated ethylene/propylene macromonomers and/or hydrogenated ethylene/butylene macromonomers which possess a softening temperature of not more than 0° C. and carry an acrylate or methacrylate function as end group. One very preferred example used is Kraton L-1253™ (Shell AG). Kraton Liquid L-1253™ (Shell AG) is a macromonomer having a molecular weight of 4000 g/mol, is methacrylate functionalized, and possesses a saturated poly(ethylene/butylene) unit as aliphatic side chain.

In a procedure which is very advantageous in the sense of the invention, the macromonomers used comprise aliphatic acrylates, such as triacontanyl acrylate, and also higher homologs.

Vinyl compound monomers A3 are all monomers containing a vinylogous double bond capable of polymerization, especially those in which this double bond is activated for polymerization by functional groups. In this sense it is also possible to classify (meth)acrylates within the group of the vinyl monomers.

In one very advantageous embodiment of the invention, at least one of the monomers of component A, especially at least one of the monomers A3, is chosen such that it contains one or more functional groups which can be used for a crosslinking reaction of the block copolymers, especially for a thermal or radiation-chemical crosslinking, and, very particularly, for a crosslinking which is induced and/or assisted by UV radiation or by irradiation with electron beams.

With particular advantage, these can be (meth)acrylic derivatives containing unsaturated alkyl radicals in the radical $R^{VI}$, of the general formula $$CH_2=CH(R^V)(COOR^{VI}) \qquad (III)$$

in which $R^V$=H or $CH_3$. Preferred for $R^{VI}$ are alkyl radicals having from 3 to 14 carbon atoms which contain at least one C—C double bond. For acrylates modified with double bonds, allyl acrylate and acrylated cinnamates are particularly advantageous.

In one advantageous variant of the pressure sensitive adhesive of the invention, it is also possible to use acrylic monomers of the general formula (III) in which the group —$OR^{VI}$ represents another functional group for crosslinking of the adhesive or comprises two or more further and/or different functional groups for crosslinking of the adhesive. Moreover, it is also possible, very advantageously, to use as monomers A3 vinyl compounds having further double bonds which do not react during the (radical) polymerization. Particularly preferred examples are isoprene and butadiene.

Preferred examples of monomers A3 further include vinyl acetate, acrylamides, photoinitiaters functionalized with at least one double bond, tetrahydrofuryl acrylate, hydroxy-functionalized (meth)acrylates, carboxyl-functionalized (meth)acrylates, amine- or amide-functionalized (meth) acrylates, and also vinyl esters, vinyl ethers, vinyl halides, vinylidene halides, vinyl compounds containing aromatic ring systems and heterocyclic systems in α position, especially vinyl acetate, vinylformamide, vinylpyridine, ethyl vinyl ether, vinyl chloride, vinylidene chloride, and acrylonitrile.

As monomers A3 it is also possible to use, with advantage, hydroxyethyl acrylate, hydroxypropyl acrylate, hydroxyethyl methacrylate, hydroxypropyl ethacrylate, acrylic acid, methacrylic acid, allyl alcohol, maleic anhydride, itaconic anhydride, itaconic acid, benzoin acrylate, acrylated benzophenone, acrylamide, and glycerialdyl methacrylate.

In another very advantageous embodiment of the inventive pressure sensitive adhesive, functional groups capable of crosslinking are introduced which are capable of a crosslinking reaction under the effect of thermal energy. Greatly preferred in this context are hydroxyl, carboxyl, epoxy, amide, isocyanato or amino groups.

Said at least one monomer B1 is preferably chosen such that the polymer blocks P(B) are capable of forming a two-phase domain structure with the copolymer blocks P(A). Advantageous examples used as monomers for component B are vinylaromatics, methyl methacrylates, cyclohexyl methacrylates, and isobornyl methacrylates. Particularly preferred examples are methyl methacrylate and styrene.

It has been found particularly advantageous for the invention if the block copolymers have an average molecular weight $M_n$ (numerical average) of between 5 000 and 600 000 g/mol, in particular between 80 000 and 450 000 g/mol.

The fraction of the polymer blocks P(B) is preferably between 10 and 60% by weight, in particular between 15 and 40% by weight, of the overall block copolymers.

The invention additionally provides a process for preparing the inventive pressure sensitive adhesive, in which the block copolymer is prepared by a trithiocarbonate-controlled radical polymerization.

For preparing the block copolymers used for the pressure sensitive adhesives of the invention, it is also possible in principle, however, to use any polymerization which proceeds in accordance with a controlled-growth radical mechanism, such as, for example, ATRP (atom-transfer radical polymerization) or nitroxide/TEMPO controlled polymerization or, more preferably, the RAFT process (rapid addition-fragmentation chain transfer).

The polymerization can be conducted in the presence of an organic solvent or in the presence of water, or in mixtures of organic solvents and/or water, or else without solvent. It is preferred to use as little solvent as possible. Depending on conversion and temperature, the polymerization time is between 6 and 72 hours.

In the case of solution polymerization, the solvents used are preferably esters of saturated carboxylic acids (such as ethyl acetate), aliphatic hydrocarbons (such as n-hexane or n-heptane), ketones (such as acetone or methyl ethyl ketone), special boiling point spirit, aromatic solvents such as toluene or xylene, or mixtures of these solvents. For polymerization in aqueous media or in mixtures of organic and aqueous solvents, it is preferred to add emulsifiers and stabilizers for the polymerization. Polymerization initiators used are customary radical-forming compounds such as, for example, peroxides, azo compounds, and peroxosulfates. Initiator mixtures are also outstandingly suitable.

For the purpose of radical stabilization, nitroxides of type (IVa) or (IVb) are used:

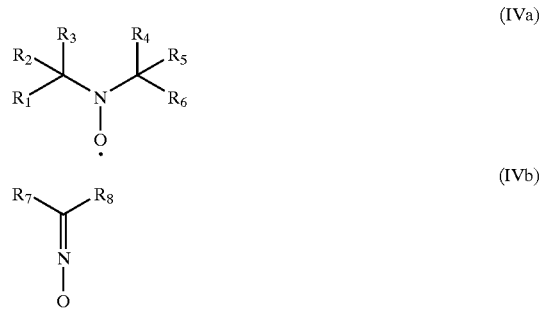

in which $R_1$, $R_2$, $R_3$, $R_4$, $R_5$, $R_6$, $R_7$, and $R_8$ independently of one another denote the following compounds or atoms:

i) halides, such as chlorine, bromine or iodine
ii) linear, branched, cyclic, and heterocyclic hydrocarbons having from 1 to 20 carbon atoms, which can be saturated, unsaturated, and aromatic,
iii) esters —COOR$_9$, alkoxides —OR$_{10}$ and/or phosphonates —PO(OR$_{11}$)$_2$, in which R$_9$, R$_{10}$ and R$_{11}$ are radicals from group ii).

The compounds (IVa) or (IVb) may also be attached to polymer chains of any kind and can therefore be used for constructing the block copolymers, as macroradicals or macroregulators.

As controlled regulators for the polymerization it is more preferred to use compounds of the following types:

2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxy (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6,-tetraethyl-1-piperidinyloxyl, 2,2,6-trimethyl-6-ethyl-1-piperidinyloxyl N-tert-butyl 1-phenyl-2-methylpropyl nitroxide N-tert-butyl 1-(2-naphthyl)-2-methylpropyl nitroxide N-tert-butyl 1-diethylphosphono-2,2-dimethylpropyl nitroxide N-tert-butyl-1-dibenzylphosphono-2,2-dimethylpropyl nitroxide N-(1-phenyl-2-methylpropyl) 1-diethylphosphono-1-methylethyl nitroxide di-t-butyl nitroxide diphenyl nitroxide t-butyl t-amyl nitroxide.

As a further controlled polymerization method, use is made of atom transfer radical polymerization (ATRP), in which preferably monofunctional or difunctional secondary or tertiary halides are used as initiators and the halide(s) is (are) abstracted using complexes of Cu, Ni, Fe, Pd, Pt, Ru, Os, Rh, Co, Ir, Cu, Ag or Au [EP 0 824 111 A1; EP 0 826 698 A1; EP 0 824 110 A1; EP 0 841 346 A1; EP 0 850 957 A1]. The various possibilities of ATRP are described further in the documents U.S. Pat. No. 5,945,491 A, U.S. Pat. No. 5,854,364 A, and U.S. Pat. No. 5,789,487 A.

The P(B)-P(A)-P(B) block copolymer can also be prepared by anionic polymerization. In this case the reaction medium used preferably comprises inert solvents, such as aliphatic and cycloaliphatic hydrocarbons, or else aromatic hydrocarbons, for example. The living polymer is generally represented by the structure P(B)-M, in which M is a metal from Group I of the Periodic Table, such as lithium, sodium or potassium, for example. The molecular weight of the polymer is determined by the ratio of initiator to monomer. In order to construct the block structure, the monomers for block P(A) are added, after which the monomer(s) for block P(B) is (are) added in order to prepare the polymer block P(B)-P(A)-P(B). Alternatively, P(B)-P(A)-M can be coupled by a suitable difunctional compound. In this way, star block copolymers [P(B)-P(A)]nX are also obtainable. Examples of suitable polymerization initiators include n-propyllithium, n-butyllithium, 2-naphthyllithium, cyclohexyllithium and octyllithium, without wishing this enumeration to constitute any unnecessary restriction.

Furthermore, it is also possible to use difunctional initiators, such as 1,1,4,4-tetraphenyl-1,4-dilithiobutane or 1,1,4,4-tetraphenyl-1,4-dilithioisobutane. Coinitiators can also be used. Examples of suitable coinitiators include lithium halides, alkali metal alkoxides, and alkylaluminum compounds.

As a very preferred variant, the RAFT process (reversible addition-fragmentation chain transfer) is carried out. The process is described in detail in the documents WO 98/01478 A1 and WO 99/31144 A1. Suitable with particular advantage for preparing block copolymers are trithiocarbonates [Macromolecules 2000, 33, 243–245], in which case, in a first step, monomers for the end blocks B are polymerized and, in a second step, the middle block A is polymerized. Following the polymerization of the end blocks, the reaction can be terminated and reinitiated. It is also possible to carry out polymerization sequentially without interrupting the reaction. In one very advantageous variant, the trithiocarbonate (V) is used for the polymerization:

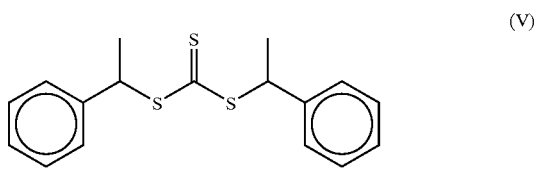

(V)

In the process for preparing the pressure sensitive adhesives of the invention, the solvent is removed under reduced pressure preferably in a concentrative extruder. This is done using, for example, single-screw or twin-screw extruders which distill off the solvent preferentially. Twin-screw extruders may be operated with advantage in corotating or counterrotating mode.

For its advantageous further development, up to 50% by weight, in particular from 20 to 40% by weight, of resins are added to the pressure sensitive adhesive of the invention. Examples of resins used include terpene resins, terpene-phenolic resins, C$_5$ and/or C$_9$ hydrocarbon resins, pinene resins, indene resins and/or rosins, alone or in combination with one another. In principle it is possible to use any resins which are compatible with the corresponding polyacrylate middle block P(A); in particular, mention may be made of all aliphatic, aromatic and alkylaromatic hydrocarbon resins, hydrocarbon resins based on pure monomers, hydrogenated hydrocarbon resins, functional hydrocarbon resins, and natural resins.

In a preferred procedure it is further possible to add additives, particularly crosslinkers, aging inhibitors, light stabilizers, ozone protectants, fatty acids, plasticizers, nucleators, expandants, accelerators and/or fillers (for example, carbon black, TiO$_2$, solid or hollow beads of glass or other materials).

Suitable crosslinkers for chemical crosslinking that are compatible with the pressure sensitive adhesive include, preferably, metal chelates, polyfunctional isocyanates, polyfunctional amines or polyfunctional alcohols. Furthermore, among others it is also possible to use polyfunctional acrylates with advantage as crosslinkers for a crosslinking induced or promoted by actinic radiation.

In the case of UV crosslinking of the pressure sensitive adhesive, UV photoinitiators are added to the block copolymers as substances which promote and/or initiate crosslinking. Useful photoinitiators whose use is very favorable include benzoin ethers, such as benzoin methyl ether and benzoin isopropyl ether, for example, substituted acetophenones, such as 2,2-diethoxy-2-phenyl-1- phenylethanone, 2,2-dimethoxy-2-phenyl-1-phenylethanone, dimethoxyhydroxyacetophenone, for example, substituted alpha-ketols, such as 2-methoxy-2-hydroxy-propiophenone, for example, aromatic sulfonyl chlorides, such as 2-naphthylsulfonyl chloride, for example, and photoactive oximes, such as 1-phenyl-1,2-propanedione 2-(O-ethoxycarbonyl)oxime, for example.

A further development which makes the inventive process particularly advantageous for the preparation of, for example, adhesive tapes is notable for the further processing of the (blended or unblended) pressure sensitive adhesive from the melt, in which case it is applied in particular to a backing.

Suitable backing materials in this context include those materials which are customary and familiar to the skilled worker, such as, for example, films (polyester, PET, PE, PP, BOPP, PVC), webs, foams, wovens and scrimmed films, and also release paper (glassine, HDPE, LDPE).

Subsequent to preparation and further processing, advantageously, the pressure sensitive adhesive is crosslinked. Crosslinking takes place preferably by means of brief UV exposure within a wavelength range of about 200 to 400 nm using commercially customary high or medium pressure mercury lamps with an output of, for example, from 80 to 240 W/cm, by means of thermal energy within a temperature range between about 70 and 140° C., or by means of ionizing radiation, such as electron beam curing, for example.

For UV crosslinking it may be appropriate to adapt the lamp output to the belt speed or, in the case of slow travel, to partially shade off the belt in order to reduce its heat exposure. The exposure time depends on the model and output of the radiation sources in question. Accordingly, the invention finally provides for the use of a pressure sensitive adhesive as described above for an adhesive tape provided on one or both sides with the pressure sensitive adhesive, particularly for an adhesive tape for bonds to apolar surfaces, said adhesive tape being prepared preferably by applying the pressure sensitive adhesive from the melt to a backing.

EXAMPLES

The purpose of the examples below is to illustrate the invention, without wishing to subject it to any unnecessary restriction.

| Commercially available chemicals employed | | |
|---|---|---|
| Substance | Manufacturer | Chemical composition |
| Vazo 67 | DuPont | 2,2'-azobis(2-ethylpropionitrile) |
| Regalite R91 | Hercules | fully hydrogenated hydrocarbon resin, $M_n$ = 500 g/mol, polydispersity = 1.4 Softening range: 85–91° C. |

Test Methods

Shear Strength (Test TA1, TA2)

A strip of adhesive tape 13 mm wide was applied to a smooth, cleaned steel surface. The area of application measured 20 mm×13 mm (length×width). Subsequently, the following procedure was carried out:

Test TA1: At room temperature, a 1 kg weight was fastened to the adhesive tape, and the time until the weight fell off was recorded.

Test TA2: At 70° C. a 1 kg weight was fastened to the adhesive tape, and the time until the weight fell off was recorded.

The shear adhesion times recorded are each recorded in minutes and correspond to the average of three measurements.

180° Bond Strength Test (Test TB1 TB1, TB2)

A strip 20 mm wide of an acrylic pressure sensitive adhesive applied to a polyester layer was applied in turn to PE (TB1) or PP (TB2) plates. The pressure sensitive adhesive strip was pressed down twice onto the substrate using a 2 kg weight. The adhesive tape was then immediately removed from the substrate at an angle of 180° and a speed of 300 mm/min. All of the measurements were conducted at room temperature under controlled-climate conditions.

The results are reported in N/cm and are averaged from three measurements.

Preparation of the Trithiocarbonate

As a regulator, the following trithiocarbonate (V) was prepared in accordance with Macromolecules 2000, 33, 243–245 and Synth. Commun. 1988, 18, 1531–1536.

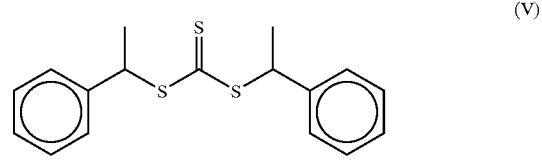

(V)

Polymerization Procedure

Trithiocarbonate-functionalized Polystyrene(VI)

A 500 ml Schlenk vessel was charged with 400 ml of styrene and 3.47 g of the trithiocarbonate (V) (0.01172 mol) and degassed three times, after which the polymerization was carried out under argon. It was initiated by heating to 120° C. and carried out with stirring for 30 hours. To isolate the product, the batch was cooled to RT and the polymer was dissolved in 1000 ml of dichloromethane and then precipitated from 7.5 l of methanol with vigorous stirring. The precipitate was filtered off on a frit and then analyzed by GPC ($M_n$=23 500, $M_w/M_n$=1.32).

Trithiocarbonate-functionalized Polystyrene (VII)

A 750 ml Schlenk vessel was charged with 500 ml of styrene and 3.47 g of the trithiocarbonate (V) (0.01172 mol) and degassed three times, after which the polymerization was carried out under argon. It was initiated by heating to 120° C. and carried out with stirring for 48 hours. To isolate the product, the batch was cooled to RT and the polymer was dissolved in 1000 ml of dichloromethane and then precipitated from 7.5 l of methanol with vigorous stirring. The precipitate was filtered off on a frit and then analyzed by GPC ($M_n$=29 100, $M_w/M_n$=1.26).

Example 1

A reactor conventional for radical polymerizations was charged with 32 g of trithiocarbonate-functionalized polystyrene (VI), 400 g of 2-ethylhexyl acrylate, 45 g of Kraton Liquid L-1253 ™ (Shell), 4 g of acrylic acid and 0.12 g of Vazo 67™ (DuPont). After argon had been passed through for 20 minutes and the reactor degassed twice, it was heated to 70° C. with stirring. After 4 hours, dilution was carried out using 200 g of acetone/special boiling point spirit (1:2), reinitiation took place after 5 hours with 0.12 g of Vazo 67™, and after 24 hours the polymerization was terminated.

For isolation, the batch was cooled to RT, the block copolymer was diluted to 40% with acetone/special boiling point spirit (1:2) and then blended with 10 parts by weight of Regalite R91 ™ (Hercules) based on the polymer fraction. The acrylic block copolymer is freed from the solvent mixture in a vacuum/drying cabinet and then coated from the melt onto a Saran-primed PET backing, 23 µm thick, at an application rate of 50 g/m² from a slot die. The product was then tested in accordance with methods TA1, TA2 and TB1, TB2.

Example 2

The procedure of Example 1 was repeated. The acrylic block copolymer was blended with 20 parts by weight of Regalite R91™ (Hercules) based on the polymer fraction. After coating from the melt, testing was carried out in accordance with methods TA1, TA2 and TB1, TB2.

Example 3

The procedure of Example 1 was repeated. The acrylic block copolymer was blended with 30 parts by weight of Regalite R91 ™ (Hercules) based on the polymer fraction. After coating from the melt, testing was carried out in accordance with methods TA1, TA2 and TB1, TB2.

Example 4

A reactor conventional for radical polymerizations was charged with 32 g of trithiocarbonate-functionalized polystyrene (VII), 340 g of n-butyl acrylate, 4 g of acrylic acid, 44 g of Kraton Liquid L-1253™ (Shell) and 0.12 g of azoisobutyronitrile (AIBN). After argon had been passed through for 20 minutes and the reactor degassed twice, it was heated to 60° C. with stirring, reinitiation took place after 2 hours with 0.12 g of Vazo 67™ (DuPont), after 6 hours, dilution was carried out using 150 g of acetone/special boiling point spirit (1:2), and after 24 hours the polymerization was terminated.

For isolation, the batch was cooled to RT, the acrylic block copolymer was diluted to 40% with acetone/special boiling point spirit (1:2) and then blended with 10 parts by weight of Regalite R91 ™ (Hercules) based on the polymer fraction. The acrylic block copolymer is freed from the solvent mixture in a vacuum/drying cabinet and then coated from the melt onto a Saran-primed PET backing, 23 µm thick, at an application rate of 50 g/m² from a slot die. The product was then tested in accordance with methods TA1, TA2 and TB1, TB2.

Example 5

The procedure of Example 4 was repeated. The acrylic block copolymer was blended with 30 parts by weight of Regalite R91 ™ (Hercules) based on the polymer fraction. After coating from the melt, testing was carried out in accordance with methods TA1, TA2 and TB1, TB2.

Example 6

A conventional radical polymerization reactor was charged with 1.6 g of trithiocarbonate (V), 400 g of 2-ethylhexyl acrylate, 40 g of Kraton Liquid L-1253™ (Shell), 100 g of acetone and 200 g of special boiling point spirit 60/95, and degassed three times, after which the polymerization was carried out under argon. It was initiated by heating to 80° C., and by addition of 0.2 g of Vazo 67™ (DuPont). After 4 hours, a further 0.2 g of Vazo 67™ (DuPont) was added and after 6 hours the batch was diluted with 100 g of special boiling point spirit 60/95. After 48 hours the polymerization was terminated, the batch was cooled to RT, and the polymer was freed from the solvent in a vacuum drying cabinet. The polymer was then dissolved in 200 g of xylene and 80 g of styrene, again transferred to a polymerization reactor and heated to 120° C., and 0.2 g of Vazo 67™ (DuPont) was added. After 6 hours, a further 0.2 g of Vazo 67™ (DuPont) was added. After 48 hours, the polymerization was terminated by cooling to RT. The block copolymer was subsequently blended with 10 parts by weight of Regalite R91 ™ (Hercules) based on the polymer fraction, freed from the solvent in a vacuum/drying cabinet, and then coated from the melt onto a Saran-primed PET backing, 23 µm thick, at an application rate of 50 g/m² using a slot die. The product was then tested in accordance with methods TA1, TA2 and TB1, TB2.

Results

The table below lists the technical properties of these adhesives.

| Example | SAT RT/ TA1 | SAT 70° C./ TA2 | BS to PE/TB1 | BS to PP/TB2 |
|---|---|---|---|---|
| 1 | +10 000 | 164 | 4.5 | 4.8 |
| 2 | +10 000 | 102 | 5.4 | 6.0 |
| 3 | +10 000 | 85 | 7.6 | 7.9 |
| 4 | +10 000 | 178 | 5.1 | 5.6 |
| 5 | +10 000 | 79 | 7.0 | 7.5 |
| 6 | +2570 | 47 | 4.0 | 4.6 |

SAT: Shear adhesion times in minutes
BS: bond strength in N/cm

Examples 1 to 3 demonstrate that the polystyrene end block-functionalized polyacrylates of the invention containing apolar side chains, in combination with the resin Regalite R91™ (Hercules), exhibit a very good bond strength to apolar surfaces. The higher the resin fraction, the higher the bond strength to PE and PP. At 30% resin, bond strengths of more than 7 N/cm are realized.

Additionally, owing to the formation of block domains in the polystyrene, crosslinking is no longer needed. The specimens have high shear strength at room temperature and therefore very good cohesion. Furthermore, the pressure sensitive adhesives are very clear and transparent, despite the fact that Regalite R91™ is a highly apolar resin and is normally not compatible with polyacrylates. Example 6 represents an inversely constructed block copolymer with the structure P(A)-P(B)-P(A). These block copolymers are also obtainable by means of the process, and can be used without additional crosslinking as strong pressure sensitive adhesives.

What is claimed is:

1. A pressure sensitive adhesive based on block copolymers, said block copolymers having at least one unit composed of three successive polymer blocks, said three successive polymer blocks being chosen in alternation from the group of the polymer blocks P(A) and P(B), wherein
   P(A) represents a copolymer block obtained from a component A which is composed of at least two monomers A1, A2, the polymer block P(A) having a softening temperature of from 80° to 0° C.

at least one (A1) of the monomers of component A is an acrylic or methacrylic acid derivative of the general formula $$CH_2=CH(R^I)(COOR^{II}) \qquad (I)$$

in which $R^I$=H or CH3 and $R^{II}$ is an aliphatic, linear, branched or cyclic, saturated or unsaturated, alkyl radical having from 1 to 20 carbon atoms, at least one (A2) of the monomers of component A is an acrylated macromonomer of the general formula $$CH_2=CH(R^{III})(COOR^{IV}) \qquad (II)$$

in which $R^{III}$=H or $CH_3$ and $R^{IV}$ is an aliphatic, linear, branched or cyclic, saturated or unsaturated alkyl radical having more than 30 carbon atoms, and the number average molecular weight $M_n$ of said at least one macromonomer is between 492 g/mol and 30 000 g/mol, P(B) represents a homopolymer or copolymer block obtained from a component B which is composed of at least one monomer B1, the polymer block P(B) having a softening temperature of from 20° C. to 175° C., and the polymer blocks P(A) are not homogeneously miscible with the polymer blocks P(B).

2. The adhesive as claimed in claim 1, wherein component A has the following composition:

from 35 to 97% by weight acrylic acid derivatives or methacrylic acid derivatives, or both, corresponding to monomer A1, from 3 to 40% by weight macromonomers corresponding to monomer A2, and from 0 to 25% by weight of further monomers A3 composed of vinyl compounds.

3. The adhesive as claimed in claim 1, wherein for the monomer A1 the radical $R^{II}$ is an alkyl radical as defined having from 4 to 14 carbon atoms.

4. The adhesive as claimed in claim 1, wherein monomer A2 is selected from the group consisting of hydrogenated ethylene/propylene macromonomers and hydrogenated ethylene/butylene macromonomers, which possess a softening temperature of not more than 0° C. and carry an acrylate or methacrylate function as end group, and combinations thereof.

5. The adhesive as claimed in claim 1, wherein at least one of the monomers of component A is chosen such that it contains one or more functional groups which can be used for a crosslinking reaction of the block copolymers.

6. The adhesive of claim 5, wherein said crosslinking reaction is a thermal or radiation-chemical crosslinking.

7. The adhesive of claim 6, wherein said crosslinking reaction is induced, assisted or induced and assisted by UV radiation or by irradiation with electron beams.

8. The adhesive as claimed in claim 1, wherein at least one of the monomers of component A is selected from the group consisting of acrylic derivatives containing at least one double bond which does not react during a radical polymerization.

9. The adhesive as claimed in claim 1, wherein said at least one monomer B1 is chosen such that the polymer blocks P(B) are capable of forming a two-phase domain structure with the copolymer blocks P(A).

10. The adhesive as claimed in claim 1, wherein the block copolymers have a number average molecular weight $M_n$ of between 5,000 and 600,000 g/mol.

11. The adhesive of claim 10, wherein said number average molecular weight $M_n$ is between 80,000 and 450,000 g/mol.

12. The adhesive as claimed in claim 1, wherein the fraction of the polymer blocks P(B) is between 10 and 60% by weight of the overall block copolymers.

13. The adhesive of claim 12, wherein said fraction of polymer blocks P(B) is between 15 and 40% by weight.

14. The adhesive as claimed in claim 1, wherein up to 50% by weight of further components selected from the group consisting of resins, crosslinkers, aging inhibitors, light stabilizers, ozone protectants, fatty acids, plasticizers, nucleators, expandants, accelerators, fillers and combinations thereof, are added.

15. The adhesive of claim 14, wherein from 20 to 40% by weight of said further components are added.

16. An adhesive tape having a high bond strength to apolar surfaces, comprising a backing having the adhesive of claim 1 on one or both sides thereof.

17. The adhesive tape of claim 16, wherein said adhesive tape is prepared by applying said adhesive as a melt to said one or both sides of said backing.

18. A process for preparing the pressure sensitive adhesive of claim 1, which comprises preparing the block copolymer by a trithiocarbonate-controlled radical polymerization.

* * * * *